UNITED STATES PATENT OFFICE.

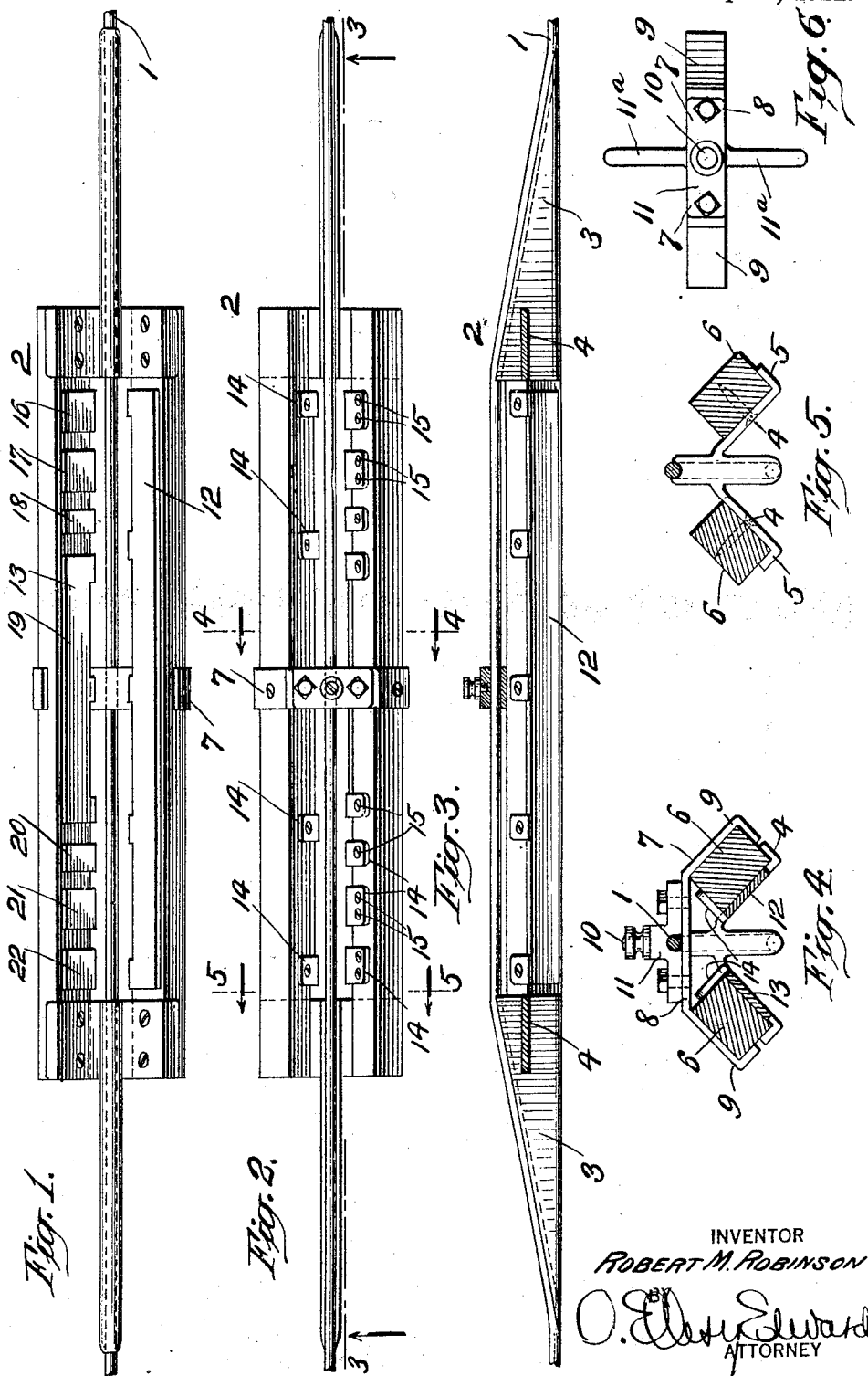

ROBERT M. ROBINSON, OF LOUISVILLE, KENTUCKY, ASSIGNOR TO CHEATHAM ELECTRIC SWITCHING DEVICE CO. INC., OF LOUISVILLE, KENTUCKY, A CORPORATION OF KENTUCKY.

TROLLEY PAN.

1,411,670.  Specification of Letters Patent.  Patented Apr. 4, 1922.

Application filed September 28, 1921. Serial No. 503,946.

*To all whom it may concern:*

Be it known that I, ROBERT M. ROBINSON, a citizen of the United States, and a resident of the city of Louisville, county of Jefferson, and State of Kentucky, have invented a new and useful Improvement in Trolley Pans, of which the following is a specification.

The object of my invention is to improve the nature and construction of trolley pans of the class and character shown and described in the Cheatham Patents Nos. 612,702, 696,313 and 917,541 respectively, which object is accomplished by my invention, one embodiment of which is hereinafter more particularly set forth.

For a more detailed description of my invention, reference is to be had to the accompanying drawings, forming a part hereof, in which—

Figure 1 is an inverted plan view of a trolley pan embodying my improvements.

Figure 2 is a plan view of the same.

Figure 3 is a longitudinal section, taken on the line 3—3 of Figure 2, looking in the direction of the arrows.

Figures 4 and 5 are sectional views, taken on the lines 4—4 and 5—5 respectively, of Figure 3, looking in the direction of the arrows, and Figure 6 is a plan view of a bracket.

Heretofore trolley pans, of the character here under consideration, have necessarily been made substantial and heavy so as to be strong enough to function properly under all conditions of service. It has been found necessary to separate the trolley wire from the conductors on its lower surfaces and in order to do this it has been customary to bend the trolley wire, and as the trolley wire is necessarily under great tension, it has been necessary to make a correspondingly strong structure. In my improved trolley pan the trolley wire is much less bent than generally hereto, and therefore the size and weights of the parts may be correspondingly reduced and the conductors on the lower surfaces of the trolley pan have been redesigned and subdivided so as to be more efficient so that the trolley pan may be made to operate with cars passing under the same at a higher speed than has been permissible heretofore.

One embodiment of my invention which obtains all these advantages is shown in the annexed drawings, wherein 1 indicates the trolley wire and 2 the trolley pan. This trolley pan is composed of the end ears 3 which are grooved on their upper surfaces and clinched on the trolley wire 1 so as to embrace the same and provided with the laterally extending brackets 4 which have upwardly extending wings 5 and these brackets 4 support wooden bars 6 which are parallel and diagonally disposed, as shown. The center of the trolley pan has a bracket 7 with a horizontal center portion 8 and downwardly and diagonally disposed ends 9 which rest on and engage the upper surfaces of the bar 6 and are secured thereto by screws or in any other suitable manner. The horizontal portion of the bracket 7 carries an insulator 10 adapted to be secured to a cross wire, in any suitable way and of any suitable kind as by a support 11, and this insulator may be secured to cross wires such as are ordinarily used for supporting a trolley wire. This support 11 carries trolley engaging ears 11ª. As the trolley pan is very light, the insulator 10 may be any suitable insulator which is strong enough for use in connection with the support of a trolley wire.

The shoes 12 and 13 on the lower surfaces of the bar 6 are preferably made of wrought iron, or similar material, and have perforated ears 14 disposed on the upper and adjacent surfaces of the wooden bars 6 and each ear has at least one screw 15 by which it may be secured to its wooden bar 6. The shoe 12 is continuous throughout its length and the shoe 13 is interrupted so as to form many sections such as 16, 17, 18, 19, 20, 21 and 22. Of these the section 19 is the longest and it is placed centrally with regard to the others so as to provide a longer contact for the trolley wheel so that when the trolley pan is in use the ground solenoids will have time to act while the trolley wheel is on the shoe 19. The numerous parts 16, 17, 18, 20, 21 and 22 are provided so that air gaps will exist and arcing be prevented and also so that one or more of these sections may be used for other purposes than switching such as locking the switch for a period of time after the trolley wheel leaves the trolley pan, or for signalling, or other purposes.

In view of the foregoing, the operation of my improved trolley pan will be readily understood. It is placed on a trolley wire and supported in the conventional manner and a trolley wheel of a trolley car runs from the wire on to the trolley pan and from the trolley pan back to the wire and while on the trolley pan the trolley wheel opens and closes various circuits incidental to the use of the trolley pan.

It is apparent that the trolley pan of this invention may be readily inserted by simply laying the same under the trolley wire and at the proper location, after the support 11 is removed and as soon as the trolley pan is in place, this support is returned to its proper position and secured in place by screws or other suitable means, and then the ends 3 are swaged to the trolley wire in the conventional manner. The cross wires are then connected to the insulator 10 and the trolley pan may be connected and put in use.

While I have shown and described one embodiment of my invention, it is obvious that it is not restricted thereto, but that it is broad enough to cover all structures that come within the scope of the annexed claims.

Having thus described my invention, what I claim is:

1. A trolley pan provided with ends adapted to be placed under a trolley wire and be secured to the same, brackets extending from said ends, bars connecting said brackets, a center bracket mounted on said bars and secured thereto and an insulator carried by said center bracket.

2. A trolley pan provided with inclined bars and means for supporting the same on each side of a trolley wire and shoes for said bars having laterally extending, perforated ears by means of which said shoes may be secured to said bars.

3. A trolley pan provided with ends adapted to lie under a trolley wire and deflect the same upwardly, brackets secured to said ends, wooden bars connecting said brackets, a center bracket connecting said bars and secured to the same, an insulator secured to said center bracket and over the trolley wire and shoes on said bars adapted to receive a trolley wheel on leaving one of said ends and to return the trolley wheel to the other of said ends when the device is in use.

4. A trolley pan with inclined bars and a central supporting bracket and means on said bracket for connecting the same with a span wire.

5. A trolley pan with inclined bars and a central supporting bracket with ears engaging a trolley wire and means on said bracket for connecting the same with a span wire.

In testimony whereof, I have hereunto set my hand this 26th day of August, 1921.

ROBT. M. ROBINSON.